(12) United States Patent
Chuang

(10) Patent No.: US 7,111,936 B1  
(45) Date of Patent: Sep. 26, 2006

(54) NOSE PAD FOR EYEGLASSES

(76) Inventor: Yu-Sheng Chuang, P.O. Box 44-2049, Taipei (TW)

( * ) Notice: Subject to any disclaimer, the term of this patent is extended or adjusted under 35 U.S.C. 154(b) by 0 days.

(21) Appl. No.: 11/258,061

(22) Filed: Oct. 26, 2005

(51) Int. Cl.
  *G02C 1/00* (2006.01)
(52) U.S. Cl. .......................... 351/82; 351/78; 351/136; 351/138; 418/36.5
(58) Field of Classification Search ................ 351/82, 351/78, 65, 136, 137, 138, 139; 428/36.5

See application file for complete search history.

(56) References Cited

U.S. PATENT DOCUMENTS 2,561,403 A * 7/1951 Nelson ..................... 351/82

\* cited by examiner

*Primary Examiner*—Hung Xuan Dang

(57) ABSTRACT

A nose pad for eyeglasses is provided. The nose pad includes a pad part, which is connected to an eyeglass frame, and a pad body filled with a buffering material. The pad body is disposed on the pad part for contacting with a user's nose. The nose pad of the present invention is applicable to all types of eyeglass frames. The elastic pad body filled with the buffering material forms a droplet shape, which can accommodate the nose shapes of different users, so as to prevent slippery and to increase wearing comfort.

9 Claims, 5 Drawing Sheets

NOSE PAD FOR EYEGLASSES

BACKGROUND OF THE INVENTION (1) Field of the Invention

The present invention relates generally to a nose pad for eyeglasses, and more particularly to a nose pad made of a buffering material, such that it can enhance the adhesion of eyeglasses to the human nose.

(2) Description of the Prior Arts

Referring to FIG. 1 and FIG. 2, a conventional nose pad for eyeglasses is illustrated. The conventional nose pad 10 includes a pad part 11 and a connector 12 formed behind the pad part 11, such that the nose pad 10 can be connected to an eyeglass frame (not shown) via a screw or other connecting members.

It is noted that the conventional pad part 11 normally has a homogeneous thickness. However, since the nose bridge of Asian people is usually lower than that of the westerners, the conventional nose pad 10 is often incapable of sufficiently supporting the eyeglasses. As a result, the eyeglasses may slide down from the nose frequently, which will easily avert the focus of the eyeglasses. This will cause an improper vision correction. Even worse, the eyeglasses will slide away from nose and be damaged, especially when the user is sweating and doing exercises.

The currently available improvement to the conventional pad part 11 is to introduce a plurality of anti-slippery mechanisms, so as to prevent the eyeglasses from sliding down from the nose. However, there is still no proposal for improving the adhesion of the nose pad 11 with the user's nose.

In addition, in the conventional one-time molded eyeglass frame, one possible improvement is to introduce a hollow chamber in the nose pad during the one-time molding manufacturing process. In this manner, the height and style of the nose pad is adjustable. However, the introduction of the hollow chamber requires higher injection molding technology, which will largely increase the cost of the eyeglass frame. In addition, if the nose pad is broken and requires a replacement, one needs to replace the entire eyeglass frame, which is rather costly.

Accordingly, the inventor of the present invention has devoted himself to develop possible solutions for the drawbacks mentioned above. At last, a new nose pad is developed.

SUMMARY OF THE INVENTION

In light of the above, one objective of the present invention is to provide a nose pad that includes an elastic pad body filled with a buffering material, such as air or water, such that the eyeglass frame is elevated. The pad body is of a droplet shape, which can enhance the adhesion of the nose pad with the user's nose and prevent the eyeglass frame from sliding down from the nose. In addition, one can obtain a better result on optical correction and usage safety.

Another objective of the present invention is to provide a nose pad that is applicable to all types of eyeglass frames. The nose pad of the present invention can be of a fixed type, an air-filled type or an adhesive type. Therefore, one can easily install the nose pad to an eyeglass frame or replace the original nose pad. In addition, the fabrication of the nose pad of the present is very simple and the cost thereof is very low.

Accordingly, the nose pad of the present invention includes a pad part, which is connected to an eyeglass frame, and a pad body filled with a buffering material. The pad body is disposed on the pad part for contacting with a user's nose.

Consequently, the pad part and the pad body can be fabricated in a one-time molding process.

Consequently, the pad part further includes an injection tube penetrated into the pad body. The buffering material is filled to the pad body through the injection tube.

Consequently, the injection tube includes an injection passageway, and an obstacle.

Consequently, the injection passageway penetrates through the pad part into the pad body for injecting the buffering material into the pad body. The injection passageway further includes a viscous epoxy filled therein for preventing the buffering material from flowing out of the pad body.

Consequently, the obstacle is protrusively disposed at one side of the injection passageway for preventing the injection tube from being over inserted into the pad body.

Consequently, the pad part further includes a connector for connecting with an eyeglass frame.

Consequently, the connector employs a screw or a connecting element to connect with the eyeglass frame.

Consequently, the pad part and the eyeglass frame are fabricated in a one-time molding process.

Consequently, the pad part and the pad body are connected with each other via an adhesive.

Consequently, the buffering material is air, water or any oily liquid.

Consequently, the pad body is made of an elastic material in a droplet shape.

Yet another objective of the present invention is to provide a nose pad filled with a buffering material for contacting a user's nose. The nose pad includes a pad part and a pad body disposed on the pad part for contacting with a user's nose. The pad body includes a free space, while pad part includes an injection tube penetrating the pad part into the pad body. The buffering material can then be filled into the free space.

Consequently, the pad part is further connected to an eyeglass frame.

In order to better understanding the contents and the particular features of the present invention, numerous preferred embodiments are described in detail by referring to the accompanying drawings.

DETAILED DESCRIPTION OF THE PREFERRED EMBODIMENTS

Figure 3:
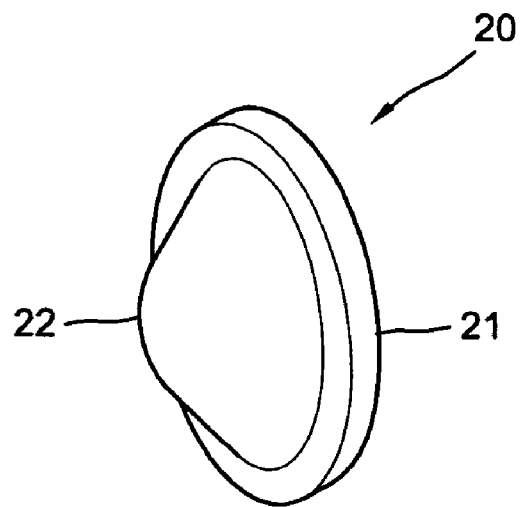
FIG. 3 is a perspective view illustrating a nose pad for eyeglasses, in accordance with the first preferred embodiment of the present invention.
Figure 4:
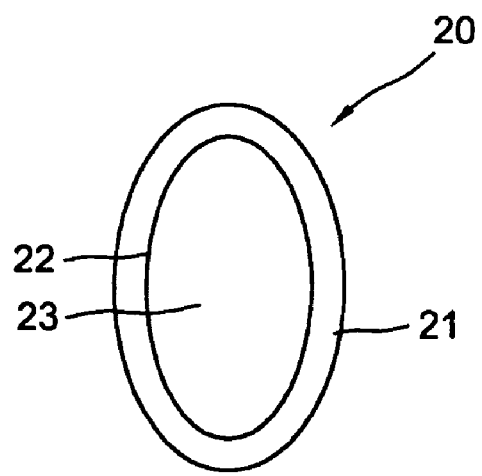
FIG. 4 is a front view of FIG. 3.
Figure 5:
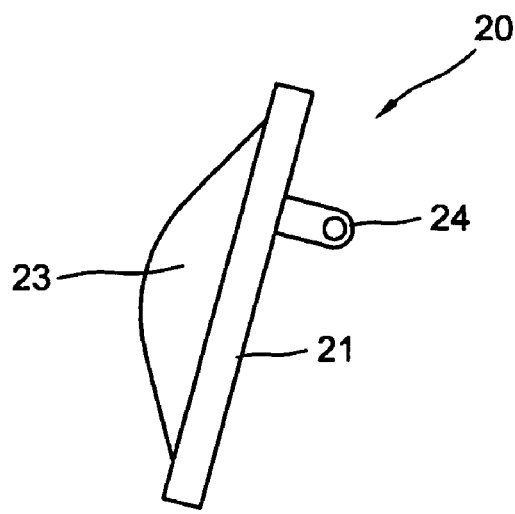
FIG. 5 is a side view of FIG. 3.

Referring to FIG. 3, FIG. 4 and FIG. 5, a perspective view, a front view and a side view in accordance with the first preferred embodiment of the present invention are illustrated, respectively. As shown, the nose pad 20 of the present invention includes a pad part 21 and a pad body 22. The pad body 22 is disposed on the pad part 21, wherein the pad body 22 further includes a free space 23 for filling therein a buffering material, so as to properly adhere with the user's nose. If the eyeglasses are of a usual assembled form, the nose pad 20 further includes a connector 24 or other connecting member (not shown) for securely fastening the nose pad 20 on an eyeglass frame (not shown) via a screw (not shown).

The pad part 21 and the pad body 22 can be fabricated in a one-time molding process, or glued together after being fabricated individually. The pad body 22 is made of an elastic material with a droplet shape. Therefore, the pad body 22 will better contact the user's nose with an increased comfort. In addition, the buffering material can be air, water or any kind of oily liquid. For example, when the buffering material is air, it can increase the elasticity of the pad body 22, such that the weight exerted on the user's nose is reduced, and at the same time, preventing the eyeglasses from sliding down. When the buffering material is water or other liquids, it can increase the softness of the pad body 22 and the ability to fall into a pattern. One can even change the color of the buffering material so as to change its fashionable style.

Figure 6:
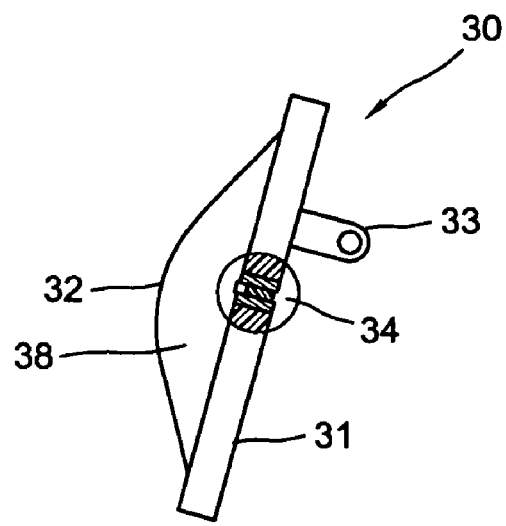
FIG. 6 is a side view illustrating the nose pad, in accordance with the second preferred embodiment of the present invention.

Referring to FIG. 6, a side view of the nose pad in accordance with the second preferred embodiment of the present invention is illustrated. The nose pad 30 also includes a pad part 31 and a pad body 32. The pad body 32 further includes a free space 38 for filling therein a buffering material. In contrast to the nose pad 20 in the first preferred embodiment, the nose pad 30 allows adjustment of the buffering material filled in the free space 38 of the pad body 32. The nose pad 30 further includes an injection tube 34, which penetrates through the pad part 31 and is inserted into the pad body 32.

Figure 7:
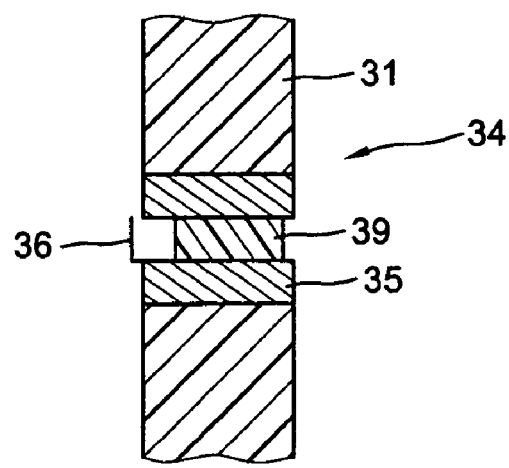
FIG. 7 is an enlarged view of the circled region in FIG. 6.

Furthermore, a partially enlarged view of the injection tube 34 is illustrated in FIG. 7. As shown, the injection tube 34 includes a injection passageway 35, and an obstacle 36. The injection passageway 35 penetrates through the pad part 31 and is inserted into the pad body 32. The injection passageway 35 is filled with a viscous epoxy 39, which can prevent the buffering material from flowing out through the injection passageway 35. The obstacle 36 is disposed at the protrusive portion of the injection passageway 35. The obstacle 36 is made of an L-shaped plate and is connected with the injection passageway 35. The protrusive portion is inserted into the free space 38 of the pad body 32.

Figure 8:
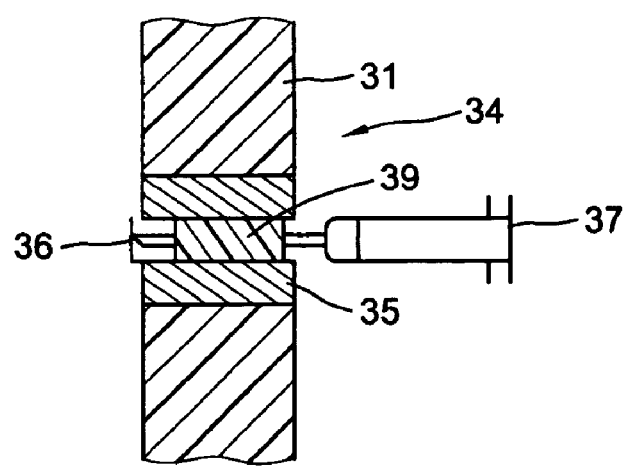
FIG. 8 is an enlarged view of the circled region in FIG. 6 after an injection tube is inserted.

Referring to FIG. 8, there is illustrated an injection tube 37 being inserted through the injection passageway 35 for injecting the buffering material. Since the size of the injection passageway is larger than that of the injection tube 37, the needle of the injection tube 37 can easily penetrate the viscous epoxy 39 of the injection passageway 35. When the injection tube 37 is inserted in the injection passageway, the viscous epoxy 39 will not be pushed away from the injection passageway 35. In addition, the viscous epoxy 39 will not obstruct the needle of the injection tube 37, either. Moreover, since the obstacle 36 is made of an L-shaped plate and protrudes out of the pad part 31, one can smoothly inject the buffering material into the free space 38 of the pad body 32 through the gap the obstacle 36. The obstacle 36 can also prevent the injection tube 37 from being over inserted into the pad body 32, which will damage the pad body 32. For example, if 0.1 cc of air is injected through the injection tube 37, the thickness of the pad body 32 can increase 0.5 mm. Therefore, the introduction of such an adjustable nose pad can better satisfy the needs of different users.

Figure 1:
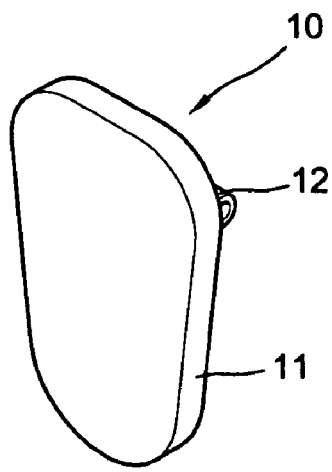
FIG. 1 is a perspective view illustrating a conventional nose pad for eyeglasses.
Figure 2:
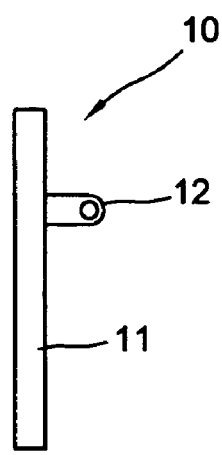
FIG. 2 is a side view of FIG. 1.
Figure 9:
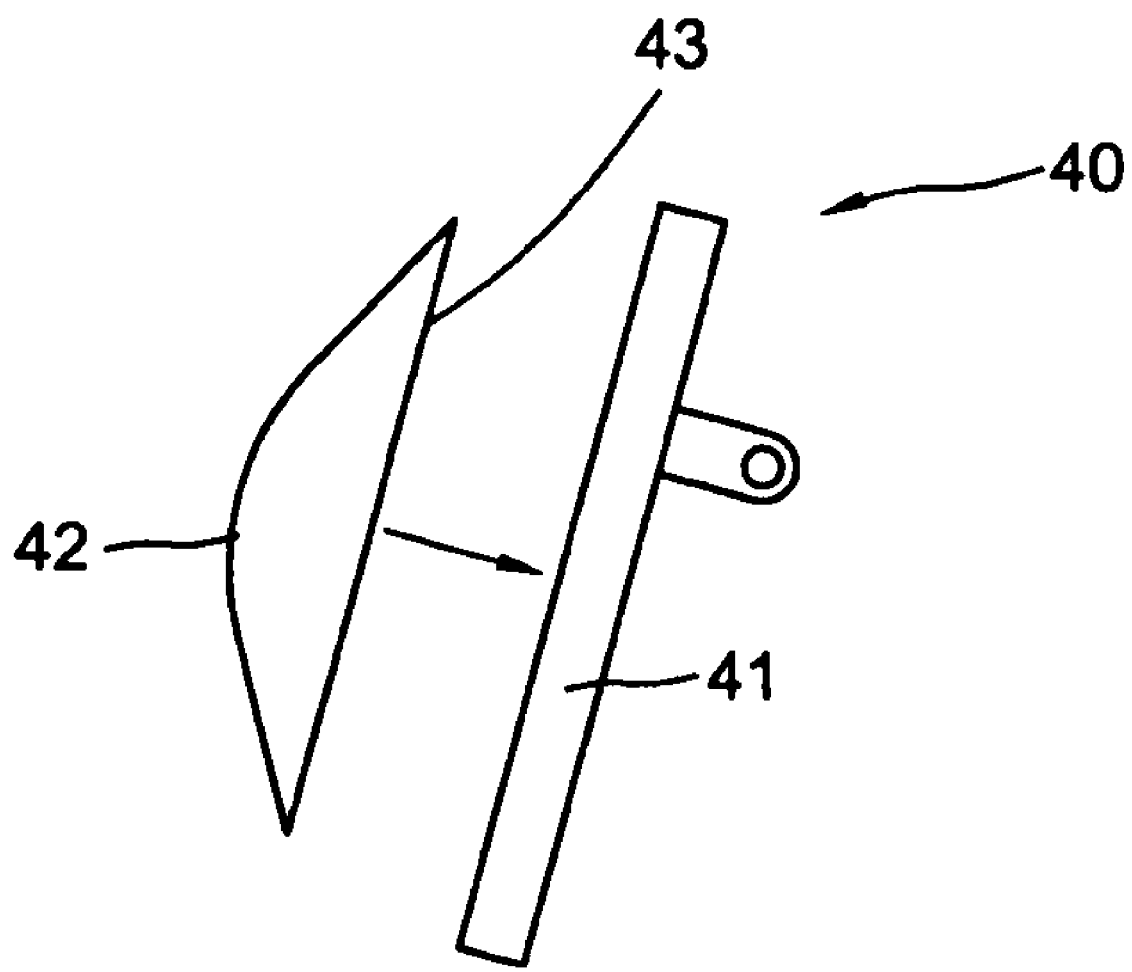
FIG. 9 is a side view illustrating the nose pad, in accordance with the third embodiment of the present invention.

Referring to FIG. 9, a nose pad in accordance with the third preferred embodiment of the present invention is illustrated. In contrast to the first and the second preferred embodiments described above, the nose pad in accordance with the third preferred embodiment is applicable to the one-time molded eyeglass frames. Since the one-time molded eyeglass frames do not include separate nose pads, it is impossible to install separate nose pads 20, 30 as described above. On the other hand, the users of the usual assembled eyeglass frames may be unwilling to replace the original nose pad 10 (as shown in FIG. 1 and FIG. 2). Therefore, the nose pad 40 in this particular embodiment includes only a pad body 42, which can be adhered to the node pad of the original eyeglass frame through an adhesive 43. Hence, the nose pad of the present invention is applicable to both the one-time molded eyeglass frames and the usual assembled eyeglass frames. In short, the nose pad of the present invention can increase the adhesion of the nose pad on the user's nose to prevent slippery, and can elevate the eyeglass frame to increase the wearing comfort.

Since the nose pad of the present invention is of a droplet shape, it can better fit the shape of a human nose that is narrower above and wider below. In addition, a variety of buffering materials, such as air, water or other liquids, can be filled into the nose pad, the weight of the eyeglass frame is then properly distributed, such that the adhesion between the eyeglass frame and the human nose and the wearing comfort are both enhanced. Furthermore, the nose pad of the present invention can also elevate the eyeglass frame, which can obtain a better result on optical correction and the safety of usage.

In summary, the droplet shape of the nose pad of the present invention provides a nose pad that can enhance the wearing comfort and the adhesion with the user's nose. The buffering material filled in the nose pad can increase the elasticity of the nose pad and elevate the eyeglass frame. In addition, one can choose the color of the buffering material according the fashionable style of the user. Moreover, the nose pad of the present invention can satisfy the needs of different eyeglass frames, which allows the installation of the nose pad on all types of eyeglass frames. For the reasons set forth above, the nose pad of the present invention is can indeed satisfy the patentability requirements of the patent law, and a grant of letters patent is thus respectfully requested.

While the invention has been described by means of specific embodiments, numerous modifications and variations could be made thereto by those skilled in the art without departing from the scope and spirit of the invention set forth in the following claims.

I claim:

1. A nose pad for eyeglasses, comprising:
   a pad part connecting with an eyeglass frame and having an injection tube; and
   a pad body, which is filled with a buffering material and the buffering material is injected into the pad body via the injection tube, the pad part and the pad body are formed in a one-time molding process, wherein the pad body is disposed on the pad part for contacting the user's nose.

2. The nose pad as recited in claim 1, wherein the injection tube includes an injection passageway and an obstacle, the injection passageway penetrating the pad part, thereby providing the injection tube to inject the buffering material, the injection passageway comprising a viscous epoxy filled therein for preventing the buffering material from flowing out, the obstacle being protrusively disposed at one side of the injection passageway for preventing the injection tube from being over inserted into the nose pad.

3. The nose pad as recited in claim 1, wherein the pad part and the eyeglass frame are fabricated in a one-time molding process.

4. The nose pad as recited in claim 1, wherein the pad part further comprises a connector for connecting with the eyeglass frame, the connector being connected with the eyeglass frame via a screw or a connecting element.

5. The nose pad as recited in claim 1, wherein the pad part and the pad body are connected through an adhesive.

6. The nose pad as recited in claim 1, wherein the buffering material comprises air, water or oily liquid.

7. The nose pad as recited in claim 1, wherein the pad body is made of an elastic material in a droplet shape.

8. A nose pad filled with a buffering material, the nose pad comprising:

a pad part; and a pad body disposed on the pad part for contacting with a user's nose, the pad body comprising a free space, wherein the pad part further comprises an injection tube penetrating the pad part into the pad body, thereby filling the buffering material into the free space.

9. The nose pad as recited in claim 8, wherein the pad part is connected to an eyeglass frame.

* * * * *